United States Patent
Bessel et al.

(10) Patent No.: US 10,626,870 B2
(45) Date of Patent: Apr. 21, 2020

(54) RING WELD BLOCKER IN DISCHARGE CHECK VALVE

(71) Applicants: Kurt William Robert Bessel, Mexico, NY (US); Ronald J. Duppert, Fayetteville, NY (US); Todd M. Lynch, East Syracuse, NY (US)

(72) Inventors: Kurt William Robert Bessel, Mexico, NY (US); Ronald J. Duppert, Fayetteville, NY (US); Todd M. Lynch, East Syracuse, NY (US)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 917 days.

(21) Appl. No.: 14/736,976

(22) Filed: Jun. 11, 2015

(65) Prior Publication Data
US 2016/0363122 A1    Dec. 15, 2016

(51) Int. Cl.
*F04C 29/12* (2006.01)
*F04C 23/00* (2006.01)
(Continued)

(52) U.S. Cl.
CPC ........ *F04C 29/124* (2013.01); *F04C 18/0215* (2013.01); *F04C 18/0253* (2013.01); *F04C 23/008* (2013.01); *F04C 29/0057* (2013.01); *F04C 29/0085* (2013.01); *F04C 29/126* (2013.01); *F16K 15/028* (2013.01);
(Continued)

(58) Field of Classification Search
CPC .... F04C 29/124; F04C 23/008; F04C 29/126; F04C 18/0253; F04C 18/0215; F04C 29/0057; F04C 29/0085; F04C 2240/806; F04C 2230/231; F16K 15/028; F16K 27/0209; F16K 1/222; B23P 15/001; Y10T 29/49405; Y10T 29/49425;
(Continued)

(56) References Cited

U.S. PATENT DOCUMENTS

| | | | |
|---|---|---|---|
| 3,804,212 A | * | 4/1974 | Haraikawa .............. F16D 65/18 188/72.4 |
| 4,598,778 A | | 7/1986 | Highsmith |

(Continued)

FOREIGN PATENT DOCUMENTS

| | | |
|---|---|---|
| CN | 101137824 A | 3/2008 |
| CN | 102865390 A | 1/2013 |

(Continued)

OTHER PUBLICATIONS

Translation of CN202790635U (Mar. 2013), Li. (Year: 2013).*

*Primary Examiner* — Charles G Freay
(74) *Attorney, Agent, or Firm* — Reinhart Boerner Van Deuren P.C.

(57) ABSTRACT

A discharge check valve assembly for a compressor having a discharge opening. The discharge check valve assembly includes a valve body adapted to be positioned at the discharge opening of the compressor. A discharge tube is assembled to the valve body, and a check valve member is disposed in the valve body. In certain embodiments, the check valve member is biased in a closed position by a biasing spring. A weld block member is positioned at an interface between the valve body and the discharge tube, and a first weld couples the discharge tube and the valve body at a first weld point.

24 Claims, 4 Drawing Sheets

(51) Int. Cl.
*F04C 18/02* (2006.01)
*F04C 29/00* (2006.01)
*F16K 15/02* (2006.01)
*F16K 27/02* (2006.01)

(52) U.S. Cl.
CPC .... *F16K 27/0209* (2013.01); *F04C 2230/231* (2013.01); *F04C 2240/806* (2013.01)

(58) Field of Classification Search
CPC ......... Y10T 29/49419; Y10T 29/49421; B29L 2031/7506; B23K 9/0282
USPC .......................................................... 228/50
See application file for complete search history.

(56) References Cited

U.S. PATENT DOCUMENTS

| | | | |
|---|---|---|---|
| 5,055,010 A * | 10/1991 | Logan | F04B 39/123 417/312 |
| 5,141,420 A * | 8/1992 | Nambiar | B23K 20/129 137/220 |
| 5,988,692 A * | 11/1999 | Springer | F16L 47/24 285/148.13 |
| 6,171,084 B1 * | 1/2001 | Wallis | F04C 23/008 137/512.1 |
| 6,398,530 B1 | 6/2002 | Hasemann | |
| 6,428,292 B1 | 8/2002 | Wallis et al. | |
| 6,582,211 B2 | 6/2003 | Wallis et al. | |
| 6,814,551 B2 | 11/2004 | Kammhoff et al. | |
| 6,960,070 B2 | 11/2005 | Kammhoff et al. | |
| 7,112,046 B2 | 9/2006 | Kammhoff et al. | |
| 7,721,757 B2 * | 5/2010 | Ginies | F04B 39/023 137/454.4 |
| 7,997,877 B2 | 8/2011 | Beagle et al. | |
| 2002/0187062 A1 | 12/2002 | Wallis et al. | |
| 2005/0238518 A1 | 10/2005 | Ginies et al. | |
| 2007/0237664 A1 | 10/2007 | Joo et al. | |
| 2012/0187321 A1 * | 7/2012 | Small | F04B 53/1032 251/321 |
| 2013/0136642 A1 * | 5/2013 | Ginies | F04C 29/124 418/55.1 |

FOREIGN PATENT DOCUMENTS

| | | |
|---|---|---|
| CN | 202790635 U | 3/2013 |
| CN | 203477485 U | 3/2014 |
| CN | 103790831 A | 5/2014 |
| DE | 41 30 109 * | 3/1992 |
| EP | 1 998 047 A1 | 12/2008 |
| EP | 2 518 318 A1 | 10/2012 |
| JP | 2008 223716 A | 9/2008 |
| JP | 2013036335 A | 2/2013 |

* cited by examiner

RING WELD BLOCKER IN DISCHARGE CHECK VALVE

FIELD OF THE INVENTION

The present invention generally relates to scroll compressors for compressing refrigerant and more particularly relates to discharge check valve assemblies for scroll compressors.

BACKGROUND OF THE INVENTION

A scroll compressor is a certain type of compressor that is used to compress refrigerant for such applications as refrigeration, air conditioning, industrial cooling and freezer applications, and/or other applications where compressed fluid may be used. Such prior scroll compressors are known, for example, as exemplified in U.S. Pat. No. 6,398,530 to Hasemann; U.S. Pat. No. 6,814,551, to Kammhoff et al.; U.S. Pat. No. 6,960,070 to Kammhoff et al.; U.S. Pat. No. 7,112,046 to Kammhoff et al.; and U.S. Pat. No. 7,997,877, to Beagle et al., all of which are assigned to a Bitzer entity closely related to the present assignee. As the present disclosure pertains to improvements that can be implemented in these or other scroll compressor designs, the disclosures of U.S. Pat. Nos. 6,398,530, 7,112,046, 6,814,551, 7,997,877 and 6,960,070 are hereby incorporated by reference in their entireties.

Additionally, particular embodiments of scroll compressors are disclosed in U.S. Pat. No. 6,582,211 to Wallis et al., U.S. Pat. No. 6,428,292 to Wallis et al., and U.S. Pat. No. 6,171,084 to Wallis et al., the teachings and disclosures of which are hereby incorporated by reference in their entireties.

As is exemplified by these patents, scroll compressors conventionally include an outer housing having a scroll compressor contained therein. A scroll compressor includes first and second scroll compressor members. A first compressor member is typically arranged stationary and fixed in the outer housing. A second scroll compressor member is moveable relative to the first scroll compressor member in order to compress refrigerant between respective scroll ribs which rise above the respective bases and engage in one another. Conventionally the moveable scroll compressor member is driven about an orbital path about a central axis for the purpose of compressing refrigerant. An appropriate drive unit, typically an electric motor, is usually provided within the same housing to drive the movable scroll member.

In conventional two-part valve assemblies, the body may be welded to the shell before the valve internals (e.g., valve, spring, spring retainer, etc.) are installed. Introduction of welding heat could damage those internal components so they are typically installed later. Any space between the valve body and discharge tube provides an entry point for weld material, which can progress along the interface between the valve body and the discharge tube, and enter the valve cavity.

One possible solution to this is to tighten up diameter tolerances, for example an interference fit between valve body and discharge tube, such that the space for weld material is minimized or eliminated so that weld material is not able to enter the valve assembly. Tightening tolerances may be costly and time-consuming with respect to the manufacturing process. However, when roundness errors or warping from the heat of welding affects the components, any tight clearance or interference fit may be adversely affected such that the discharge check valve assembly is damaged or does not seal correctly. Another possible solution is to size the steps of the valve body and discharge tube such that the step in integrated into the valve body. This is also costly and adds time and complexity to the manufacturing process.

Embodiments of the invention provide a discharge check valve assembly that addresses the aforementioned problem. These and other advantages of the invention, as well as additional inventive features, will be apparent from the description of the invention provided herein.

BRIEF SUMMARY OF THE INVENTION

In one aspect, embodiments of the invention provide a discharge check valve assembly for a compressor having a discharge opening. The discharge check valve assembly includes a valve body adapted to be positioned at the discharge opening of the compressor. A discharge tube is assembled to the valve body, and a check valve member is disposed in the valve body and biased in a closed position by a biasing spring. A weld block member is positioned at an interface between the valve body and the discharge tube, and a first weld couples the discharge tube and the valve body at a first weld point.

In some embodiments, a spring retainer holds the biasing spring in the valve body. In a further embodiment, the weld block member acts as a seat for the spring retainer. The valve body may be tubular with an interior surface, and the weld block member may be a snap ring disposed in an annular groove in the interior surface. In a particular embodiment, the weld block member holds the biasing spring, spring retainer, and valve member inside the valve body.

In a further aspect, embodiments of the invention include a scroll compressor that includes the aforementioned discharge check valve assembly. The scroll compressor includes a housing comprising a cylindrical shell section arranged about an axis that is vertically extending, scroll compressor bodies in the housing having respective bases and respective scroll ribs that project from the respective bases and which mutually engage for compressing fluid, an electrical motor having a stator and a rotor, and a drive shaft for rotation. The rotor acts upon the drive shaft that, in turn, acts upon the scroll compressor bodies to facilitate relative orbiting movement between the scroll compressor bodies. The discharge check valve assembly is welded to the scroll compressor housing at a second weld point. The first weld point may be spaced apart from the second weld point. In certain embodiments, the weld block member is annular. Further, the weld block member may be made from steel.

In another aspect, embodiments of the invention provide a discharge check valve assembly for a compressor having a discharge opening. The discharge check valve assembly includes a valve body adapted to be positioned at the discharge opening of the compressor, a discharge tube attached to the valve body, a check valve member disposed within the valve body, and a biasing spring and a spring retainer to secure the biasing spring within the valve body. A weld block member is affixed to an interior surface of the valve body. The weld block member is arranged to hold the spring retainer within the valve body, such that the spring retainer is sandwiched between the weld block member and an open inlet end of the valve body.

The discharge check valve assembly may further include a first weld that couples the discharge tube and the valve body at a first weld point. Further, the discharge check valve assembly may be welded to the scroll compressor housing at a second weld point spaced apart from the first weld point.

In some embodiments, the weld block member acts as a seat for the spring retainer. In a further embodiment, the valve body is tubular with an interior surface, and the weld block member is a snap ring disposed in an annular groove in the interior surface. The weld block member may hold the biasing spring, spring retainer, and valve member inside the valve body. In a particular embodiment, the weld block member abuts the discharge tube and serves as a seat for the discharge tube during assembly.

In another aspect, embodiments of the invention provide a method of manufacturing a scroll compressor. The method includes the steps of welding a valve body into the refrigerant outlet port of a scroll compressor, assembling a valve member, a biasing spring, and a spring retainer into the valve body, and assembling a weld block member at an outlet end of the valve body such that the weld block member prevents weld material from entering the valve body. The method further includes welding a discharge tube to the valve body.

In some embodiments of the method, assembling a weld block member at an outlet end of the valve body calls for assembling a snap ring into an annular groove at an outlet end of the valve body. In other embodiments, assembling a weld block member at an outlet end of the valve body includes assembling a weld block member that is a seat for the spring retainer. In certain embodiments, the weld block member acts to retain the valve member, biasing spring, and spring retainer in their final position in valve body prior to welding the discharge tube. Further, the method may include seating the discharge tube against the weld block member prior to welding the discharge tube to the valve body.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
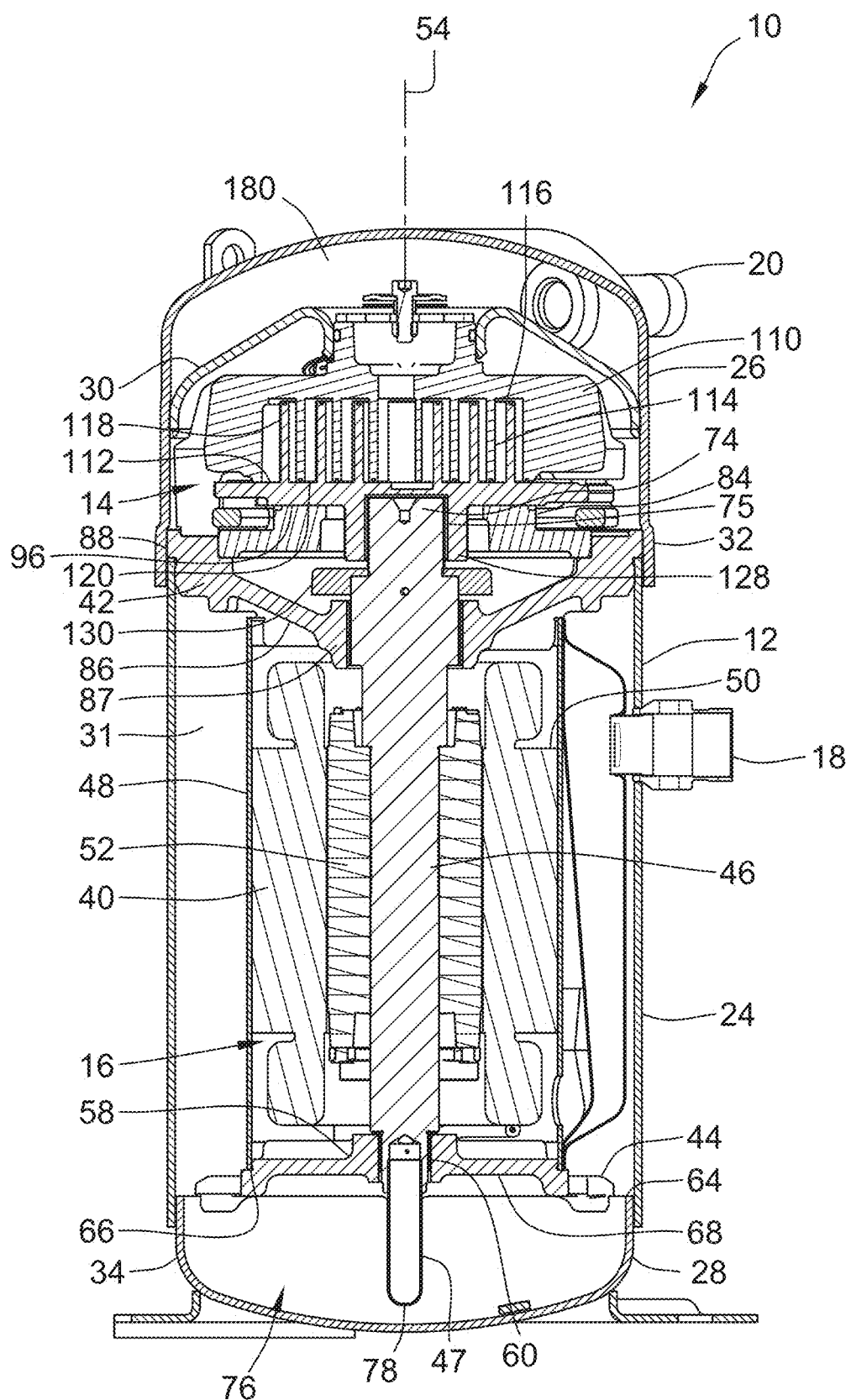
FIG. 1 is a cross-sectional isometric view of a scroll compressor assembly, according to an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

An embodiment of the present invention is illustrated in the figures as a scroll compressor assembly 10 generally including an outer housing 12 in which a scroll compressor 14 can be driven by a drive unit 16. The scroll compressor assembly 10 may be arranged in a refrigerant circuit for refrigeration, industrial cooling, freezing, air conditioning or other appropriate applications where compressed fluid is desired. Appropriate connection ports provide for connection to a refrigeration circuit and include a refrigerant inlet port 18 and a refrigerant outlet port 20 extending through the outer housing 12. The scroll compressor assembly 10 is operable through operation of the drive unit 16 to operate the scroll compressor 14 and thereby compress an appropriate refrigerant or other fluid that enters the refrigerant inlet port 18 and exits the refrigerant outlet port 20 in a compressed high-pressure state. The scroll compressor assembly 10 receives low-pressure refrigerant at the refrigerant inlet port 18 and compresses the refrigerant for delivery to a high-pressure chamber 180 where it can be discharged through the refrigerant outlet port 20.

The outer housing 12 for the scroll compressor assembly 10 may take many forms. In particular embodiments of the invention, the outer housing 12 includes multiple shell sections. In the embodiment of FIG. 1, the outer housing 12 includes a central cylindrical housing section 24, and a top end housing section 26, and a bottom end housing section 28 that serves as a mounting base. In certain embodiments, the housing sections 24, 26, 28 are formed of appropriate sheet steel and welded together to make a permanent outer housing 12 enclosure. However, if disassembly of the housing is desired, other housing assembly provisions can be made that can include metal castings or machined components, wherein the housing sections 24, 26, 28 are attached using fasteners.

As can be seen in the embodiment of FIG. 1, the central housing section 24 is cylindrical, joined with the top end housing section 26. In this embodiment, a separator in the form of separator plate 30 is disposed in the top end housing section 26. During assembly, these components can be assembled such that a single circumferential weld around the inner surface of the outer housing 12 joins the top end housing section 26 and the separator plate 30. A second circumferential weld may externally join the top end housing section 26 and central cylindrical housing section 24. In particular embodiments, the central cylindrical housing section 24 is welded to the single-piece bottom shell 28, though, as stated above, alternate embodiments would include other methods of joining (e.g., fasteners) these sections of the outer housing 12.

Assembly of the outer housing 12 results in the formation of an enclosed chamber 31 that surrounds the drive unit 16, and partially surrounds the scroll compressor 14. In particular embodiments, the top end housing section 26 is generally dome-shaped and includes a respective cylindrical side wall region 32 that fits telescopically with the top of the central cylindrical housing section 24, and provides for closing off the top end of the outer housing 12. As can also be seen from FIG. 1, the bottom of the central cylindrical housing section 24 fits telescopically with a cylindrical sidewall region 34 of the bottom end housing section 28. In at least one embodiment of the invention, the central cylindrical housing section 24 and bottom end housing section 28 are joined by an exterior weld around the circumference of a bottom end of the outer housing 12.

In a particular embodiment, the drive unit 16 in is the form of an electrical motor assembly 40. The electrical motor assembly 40 operably rotates and drives a shaft 46. Further, the electrical motor assembly 40 generally includes a stator 50 comprising electrical coils and a rotor 52 that is coupled to the drive shaft 46 for rotation together. The stator 50 is supported by the outer housing 12, either directly or via an adapter. The stator 50 may be press-fit directly into outer housing 12, or may be fitted with an adapter (not shown) and press-fit into the outer housing 12. In a particular embodiment, the rotor 52 is mounted on the drive shaft 46, which is supported by upper and lower bearing members 42, 44. Energizing the stator 50 is operative to rotatably drive the rotor 52 and thereby rotate the drive shaft 46 about a central axis 54.

Applicant notes that when the terms "axial" and "radial" are used herein to describe features of components or assemblies, they are defined with respect to the central axis 54. Specifically, the term "axial" or "axially-extending" refers to a feature that projects or extends in a direction generally parallel to the central axis 54, while the terms "radial' or "radially-extending" indicates a feature that projects or extends in a direction generally perpendicular to the central axis 54. Some minor variation from parallel and perpendicular is permissible.

With reference to FIG. 1, the lower bearing member 44 includes a central, generally cylindrical hub 58 that includes a central bushing and opening to provide a cylindrical bearing 60 to which the drive shaft 46 is journaled for rotational support. A plate-like ledge region 68 of the lower bearing member 44 projects radially outward from the cylindrical hub 58, and serves to separate a lower portion of the stator 50 from an oil lubricant sump 76. In an embodiment of the invention, the lower bearing member 44 may rest on the top face 64 of the bottom end housing section 28. The lower bearing member 44 is, in turn, centered radially at the lower end opening 66 of the stator housing 48.

In the embodiment of FIG. 1, the drive shaft 46 has an impeller tube 47 attached at the bottom end of the drive shaft 46. In a particular embodiment, the impeller tube 47 is of a smaller diameter than the drive shaft 46 and is aligned concentrically with the central axis 54. As can be seen from FIG. 1, the drive shaft 46 and impeller tube 47 pass through an opening in the cylindrical hub 58 of the lower bearing member 44. At its upper end, the drive shaft 46 is journaled for rotation within the upper bearing member 42. Upper bearing member 42 may also be referred to as a "crankcase."

The drive shaft 46 further includes an offset eccentric drive section 74 that has a cylindrical drive surface 75 (shown in FIG. 2) about an offset axis that is offset relative to the central axis 54. This offset drive section 74 is journaled within a cavity of a movable scroll compressor body 112 of the scroll compressor 14 to drive the movable scroll compressor body 112 about an orbital path when the drive shaft 46 rotates about the central axis 54. To provide for lubrication of all of the various bearing surfaces, the outer housing 12 provides the oil lubricant sump 76 at the bottom end of the outer housing 12 in which suitable oil lubricant is provided. The impeller tube 47 has an oil lubricant passage and inlet port 78 formed at the end of the impeller tube 47. Together, the impeller tube 47 and inlet port 78 act as an oil pump when the drive shaft 46 is rotated, and thereby pumps oil out of the lubricant sump 76 into an internal lubricant passageway 80 defined within the drive shaft 46. During rotation of the drive shaft 46, centrifugal force acts to drive lubricant oil up through the lubricant passageway 80 against the action of gravity. The lubricant passageway 80 has various radial passages projecting therefrom to feed oil through centrifugal force to appropriate bearing surfaces and thereby lubricate sliding surfaces as may be desired.

Figure 2:
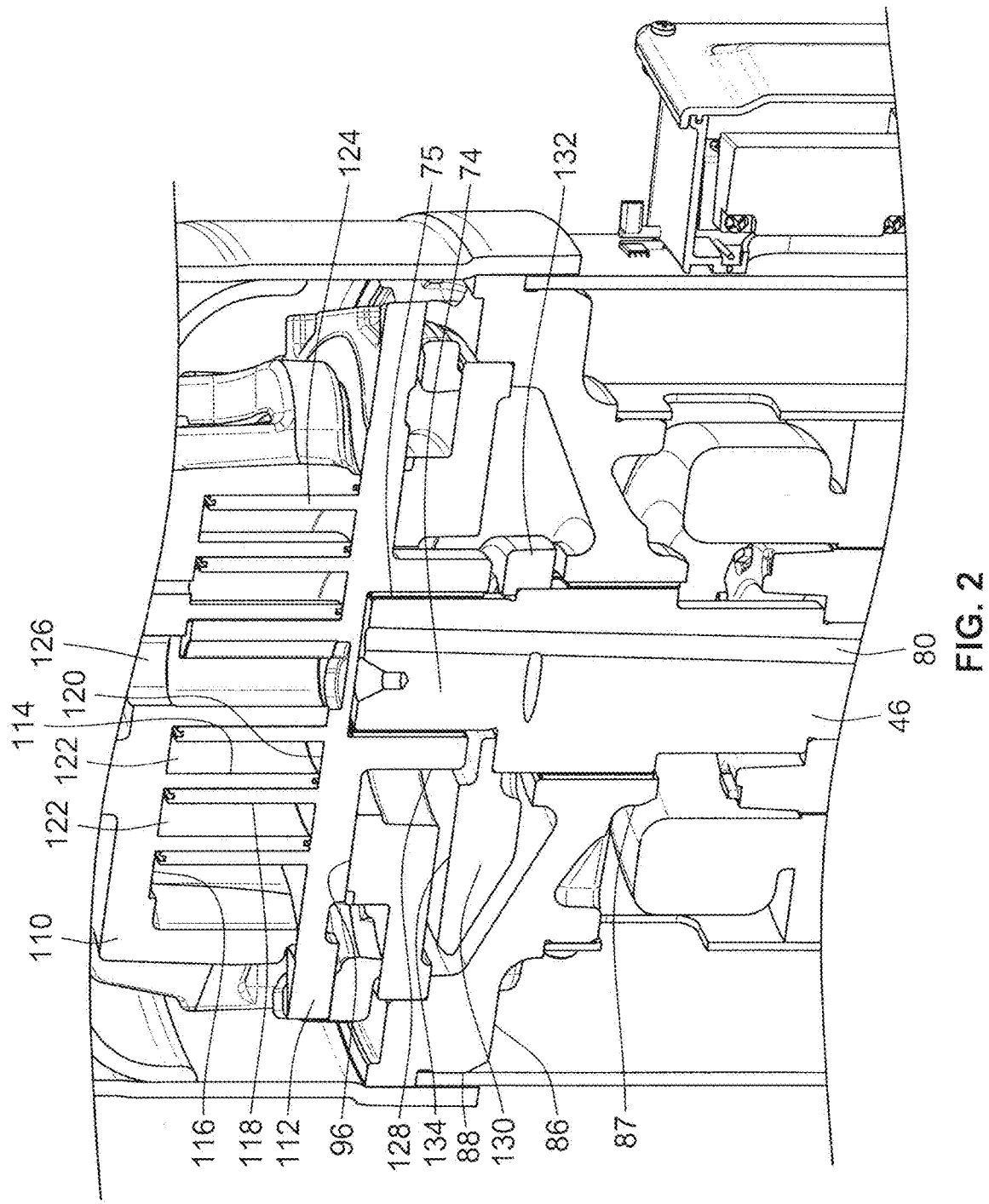
FIG. 2 is a cross-sectional isometric view of an upper portion of the scroll compressor assembly of FIG. 1.

The upper bearing member 42, or crankcase, includes a central bearing hub 87 into which the drive shaft 46 is journaled for rotation. Extending outward from the central bearing hub 87 is a disk-like portion 86 that terminates in an intermittent perimeter support surface 88. In the embodiments of FIGS. 1 and 2, the central bearing hub 87 extends below the disk-like portion 86, while a thrust bearing 84 is assembled above the disk-like portion 86 and contains a thrust surface 96, which provides axial support for the moveable scroll compressor body 112. In certain embodiments, the intermittent perimeter support surface 88 is adapted to have an interference and press-fit with the outer housing 12. It is understood that particular embodiments of the invention may include crankcase posts with threaded holes to receive fasteners for assembly. Alternate embodiments of the invention also include those in which the posts are integral with a pilot ring instead of the crankcase 42.

Turning in greater detail to the scroll compressor 14, the scroll compressor 14 includes first and second scroll compressor bodies which preferably include a stationary fixed scroll compressor body 110 and a movable scroll compressor body 112. While the term "fixed" generally means stationary or immovable in the context of this application, more specifically "fixed" refers to the non-orbiting, non-driven scroll member, as it is acknowledged that some limited range of axial, radial, and rotational movement is possible due to thermal expansion and/or design tolerances.

The movable scroll compressor body 112 is arranged for orbital movement relative to the fixed scroll compressor body 110 for the purpose of compressing refrigerant. The fixed scroll compressor body includes a first scroll rib 114 projecting axially from a plate-like base 116 and is designed in the form of a spiral. Similarly, the movable scroll compressor body 112 includes a second scroll rib 118 projecting axially from a plate-like base 120 and is in the shape of a similar spiral. The scroll ribs 114, 118 engage in one another and abut sealingly on the respective surfaces of bases 120, 116 of the respectively other scroll compressor body 112, 110. As a result, multiple compression chambers 122 are formed between the scroll ribs 114, 118 and the bases 120, 116 of the compressor bodies 112, 110. Within the chambers 122, progressive compression of refrigerant takes place. Refrigerant flows with an initial low pressure via an intake area 124 surrounding the scroll ribs 114, 118 in the outer radial region (see e.g. FIGS. 1-2). Following the progressive compression in the chambers 122 (as the chambers progressively are defined radially inward), the refrigerant exits via a compression outlet 126 that is defined centrally within the base 116 of the fixed scroll compressor body 110. Refrigerant that has been compressed to a high pressure can exit the chambers 122 via the compression outlet 126 during operation of the scroll compressor 14.

The movable scroll compressor body 112 engages the eccentric offset drive section 74 of the drive shaft 46. More specifically, the receiving portion of the movable scroll compressor body 112 includes the cylindrical bushing drive hub 128 which slideably receives the eccentric offset drive section 74 with a slideable bearing surface provided therein. In detail, the eccentric offset drive section 74 engages the cylindrical bushing drive hub 128 in order to move the movable scroll compressor body 112 about an orbital path about the central axis 54 during rotation of the drive shaft 46 about the central axis 54.

Considering that this offset relationship causes a weight imbalance relative to the central axis 54, the assembly typically includes a counterweight 130 that is mounted at a fixed angular orientation to the drive shaft 46. The counterweight 130 acts to offset the weight imbalance caused by the eccentric offset drive section 74 and the movable scroll compressor body 112 that is driven about an orbital path. The counterweight 130 includes an attachment collar 132 and an offset weight region 134 that provides for the counterweight effect and thereby balancing of the overall weight of the components rotating about the central axis 54. This provides for reduced vibration and noise of the overall assembly by internally balancing or cancelling out inertial forces.

Figure 3:
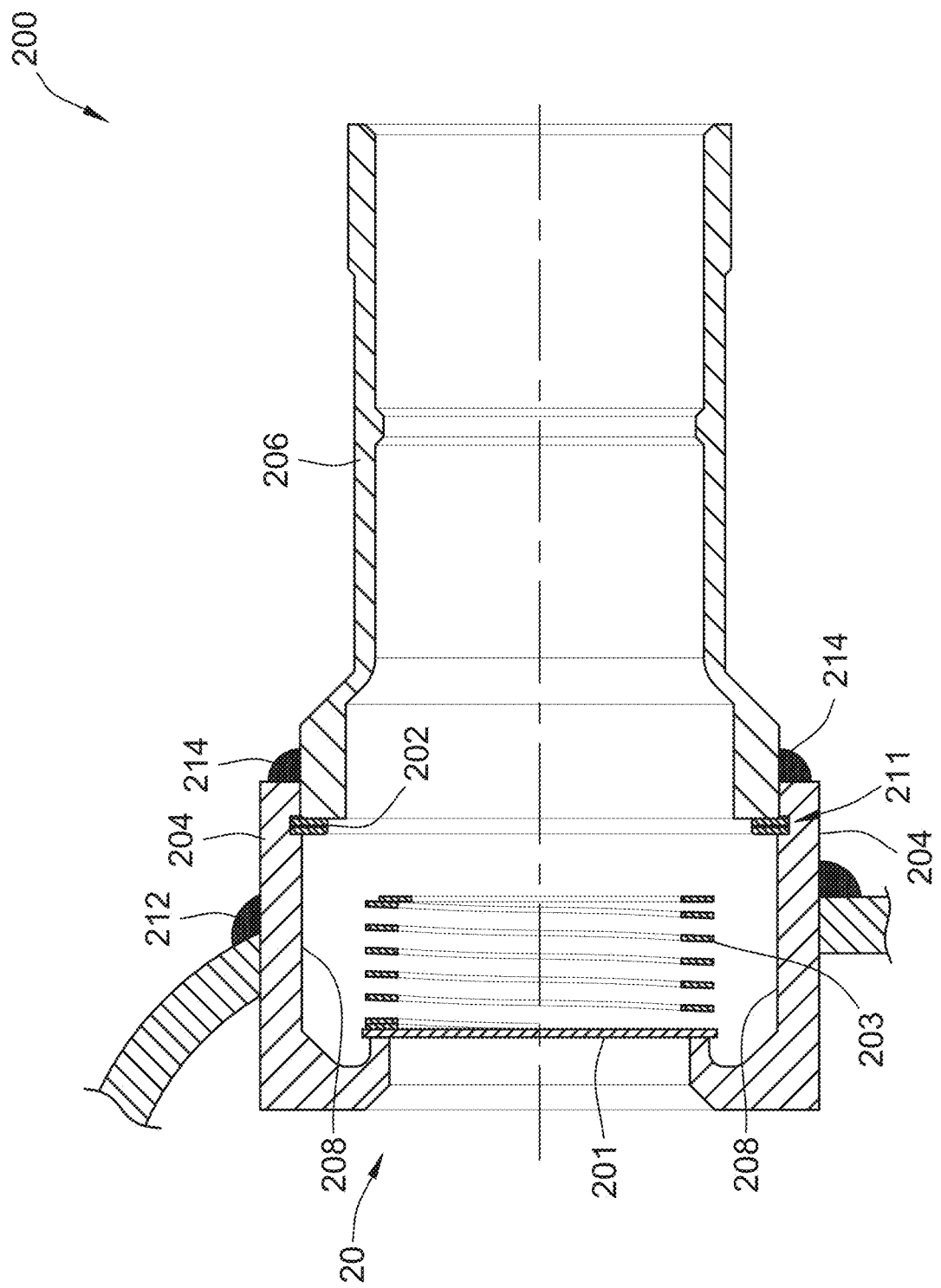
FIG. 3 is a cross-sectional view of a discharge check valve assembly, in accordance with an embodiment of the invention.
Figure 4:
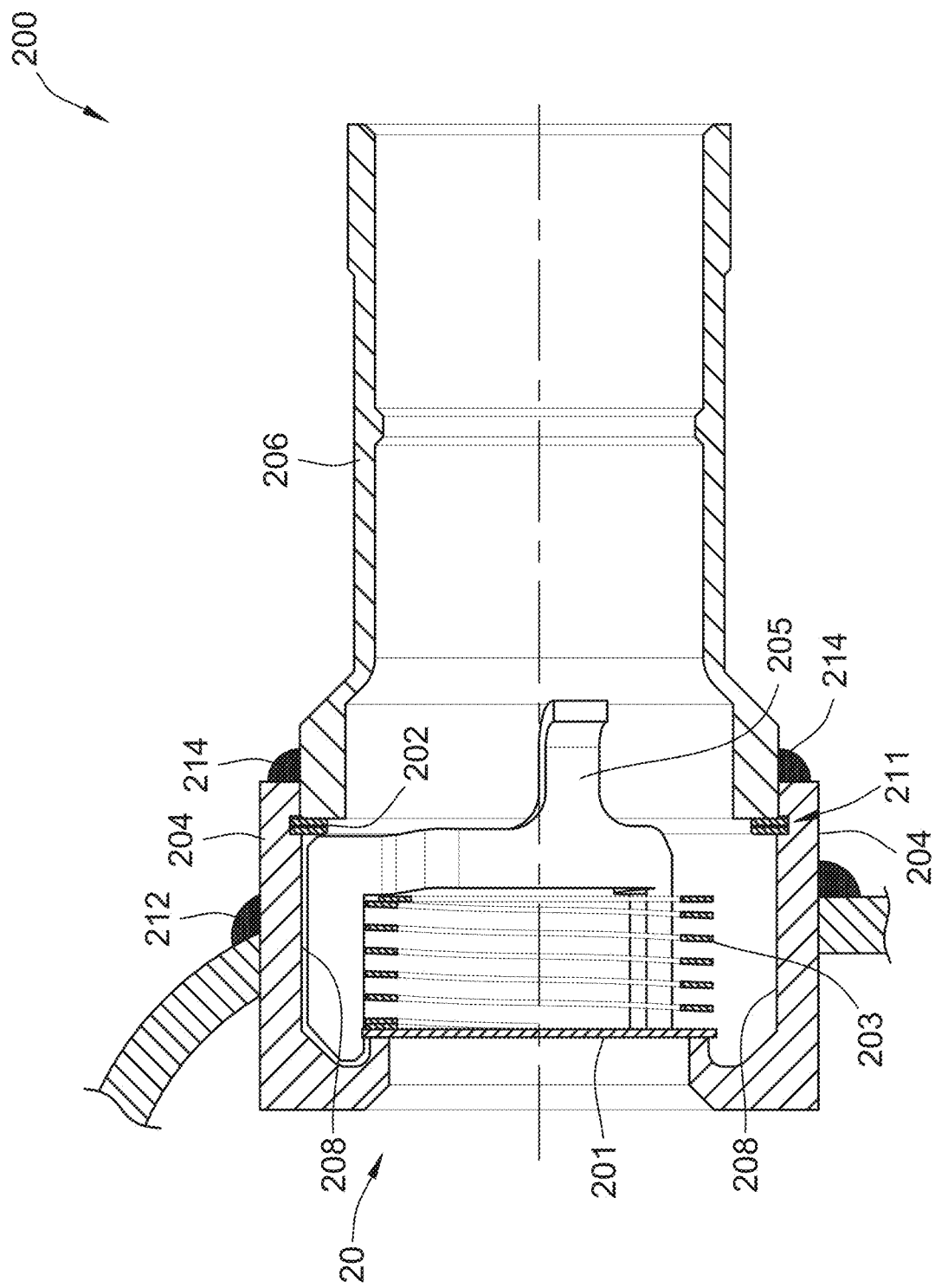
FIG. 4 is a cross-sectional view of a discharge check valve assembly of FIG. 3 showing an exemplary spring retainer, in accordance with an embodiment of the invention.

FIG. 3 is a cross-sectional view of a discharge check valve assembly 200 having a weld block member 202, according to an embodiment of the invention. FIG. 4 is a cross-sectional view of a discharge check valve assembly 200 of FIG. 3, and includes a spring retainer 205. The discharge check valve assembly 200 is located at a refrigerant outlet port 20 of the scroll compressor 10 (see FIG. 1). However, while the invention is described herein with respect to its application in a scroll compressor, one of skill in the art will recognize that the invention can be used in any compressor which could have a discharge check valve.

The discharge check valve assembly 200 includes a valve body 204 assembled to a refrigerant outlet port or opening 20 of the compressor 10 (shown in FIG. 1). In the embodiment of FIGS. 3 and 4, the valve body 204 is welded in the refrigerant outlet port 20 of the compressor at a weld point 212. A discharge tube 206 is attached to the valve body 204. One method of attaching the discharge tube 206 to the valve body 204 is by welding, for example at a second weld point 214 spaced apart from weld point 212. Within the valve body 204 resides a valve member 201, a biasing spring 203, and the spring retainer 205. In a particular embodiment, the valve body 204 is tubular and has a cylindrical inner surface 208 with an annular groove 211 therein. In such an embodiment, the weld block member 202 is a snap ring disposed in the annular groove 211 in the cylindrical inner surface 208. In certain embodiments, the weld block member 202 is annular, or ring-shaped, and constructed from steel or a similarly hard and durable material.

In operation, the biasing spring 203 urges the valve member 201 toward the closed position. The valve member 201 is opened by the pressure of the fluid flow to the refrigerant outlet port 20 of the compressor. The spring retainer 205 keeps the biasing spring 203 aligned and in the proper position. The weld block member 202, being located at an outlet end of the valve body 204, at the interface of the valve body 204 and discharge tube 206, acts as a barrier to weld material. When the discharge tube 206 is welded to the valve body 204, the weld block member 202 blocks weld material from getting inside of the valve body 204 and adversely affecting the valve components. The weld block member 202 may secured to the interior surface 208 of the valve body 204 using any of a number of suitable means such as welding, adhesives, mechanical fasteners, etc.

Further, the weld block member 202 provides a hardened seat for the spring retainer 205. In the open and running condition, the valve member exerts vibratory force on the spring retainer 205 through the biasing spring 203. The spring retainer 205 is typically made of a hard spring steel which can eat into the discharge tube 206. If not for the weld block member 202, damage to discharge tube 206 could be remedied by either hardening the entire discharge tube 206, for example using a harder (and chemically dissimilar to the body) and more expensive material, or by use of a specially manufactured hardened washer. However, these alternate processes are expensive and time-intensive compared to the less expensive and easy-to-assemble weld block member 202.

The weld block member 202, as shown, serves at least two purposes (i.e., hardened seat for spring retainer and weld blocker) simultaneously. The weld block member 202 provides containment for the functional internal components of the valve assembly (valve member 201, biasing spring 203, and spring retainer 205), while also serving as a barricade for weld material that would otherwise enter the valve assembly inside of the valve body 204. This feature aids in manufacture of the assembly in that, during assembly, the weld block member 202 captures and retains the biasing spring 203, valve member 201, and spring retainer 205 in place while the discharge tube 206 is being attached.

Additionally, the weld block member 202 may abut the discharge tube 206 and serve as a seat for the discharge tube 206 during assembly of the discharge check valve assembly 200. In particular embodiments of the invention, the weld block member 202 aids in the assembly by providing a hard stop when the discharge tube 206 is piloted into the valve body 204 prior to the welding of the discharge tube 206 to the valve body 204.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A discharge check valve assembly for a compressor having a discharge opening, the discharge check valve assembly comprising:
  a valve body adapted to be positioned at the discharge opening of the compressor, wherein the valve body is tubular with an interior surface and has a radially inwardly extending wall at an open inlet end of the valve body, the radially inwardly extending wall forming a valve seat;

a discharge tube assembled to the valve body, the discharge tube configured to be disposed outside of the compressor;

a check valve member disposed in the valve body;

a spring, biasing the valve in a closed position;

a weld block member positioned at an interface between the valve body and the discharge tube;

a spring retainer holding the biasing spring in the valve body, the spring retainer located between the radially inwardly extending wall and the weld block member; and a first weld coupling the discharge tube and the valve body at a first weld point.

2. The discharge check valve assembly of claim 1, wherein the weld block member acts as a seat for the spring retainer.

3. The discharge check valve assembly of claim 1, wherein the weld block member is a snap ring disposed in an annular groove in the interior surface.

4. The discharge check valve assembly of claim 3, wherein the weld block member holds the biasing spring, spring retainer, and valve member inside the valve body.

5. The discharge check valve assembly of claim 1, wherein the discharge tube abuts the weld block member.

6. The discharge check valve assembly of claim 5, wherein the weld block member holds the biasing spring, spring retainer, and valve member inside the valve body.

7. The discharge check valve assembly of claim 6, wherein the weld block member acts as a seat for the spring retainer.

8. A scroll compressor including the discharge check valve assembly of claim 1, the scroll compressor comprising:

a housing comprising a cylindrical shell section arranged about an axis that is vertically extending;

scroll compressor bodies in the housing having respective bases and respective scroll ribs that project from the respective bases and which mutually engage for compressing fluid;

an electrical motor having a stator and a rotor; and a drive shaft for rotation, the rotor acting upon the drive shaft that in turn acts upon the scroll compressor bodies to facilitate relative orbiting movement between the scroll compressor bodies;

wherein the discharge check valve assembly is welded to the scroll compressor housing at a second weld point.

9. The scroll compressor of claim 8, wherein the first weld point is spaced apart from the second weld point.

10. The discharge check valve assembly of claim 1, wherein the weld block member is annular.

11. The discharge check valve assembly of claim 1, wherein the weld block member is made from steel.

12. A discharge check valve assembly for a compressor having a discharge opening, the discharge check valve assembly comprising:

a valve body adapted to be positioned at the discharge opening of the compressor, wherein the valve body is tubular with an interior surface and has a radially inwardly extending wall at an open inlet end of the valve body, the radially inwardly extending wall forming a valve seat;

a discharge tube attached to the valve body;

a check valve member disposed within the valve body;

a weld block member affixed to the interior surface of the valve body;

a biasing spring and a spring retainer to secure the biasing spring within the valve body; and the weld block member arranged to hold the spring retainer within the valve body, wherein the spring retainer is sandwiched between the weld block member and the radially inwardly extending wall.

13. The discharge check valve assembly of claim 12, further comprising a first weld that couples the discharge tube and the valve body at a first weld point.

14. The discharge check valve assembly of claim 12, wherein the discharge check valve assembly is welded to the compressor housing at a second weld point spaced apart from the first weld point.

15. The discharge check valve assembly of claim 12, wherein the weld block member acts as a seat for the spring retainer.

16. The discharge check valve assembly of claim 12, wherein the weld block member is a snap ring disposed in an annular groove in the interior surface of the valve body.

17. The discharge check valve assembly of claim 12, wherein the weld block member holds the biasing spring, spring retainer, and valve member inside the valve body.

18. The discharge check valve assembly of claim 12, wherein the weld block member abuts the discharge tube and serves as a seat for the discharge tube during assembly.

19. A method of manufacturing a scroll compressor comprising the steps of:

welding a valve body into a refrigerant outlet port of a scroll compressor, wherein the valve body is tubular with an interior surface having a radially inwardly extending wall at an open inlet end of the valve body, the radially inwardly extending wall forming a valve seat;

assembling a valve member, a biasing spring, and a spring retainer into the valve body;

assembling a weld block member at an outlet end of the valve body such that the spring retainer is located between the radially inwardly extending wall and the weld block member, the weld block member prevents weld material from entering the valve body and acts to retain the valve member, biasing spring, and spring retainer in their final position in valve body prior to welding a discharge tube; and welding the discharge tube to the valve body.

20. The method of claim 19, wherein assembling a weld block member at an outlet end of the valve body comprises assembling a snap ring into an annular groove at an outlet end of the valve body.

21. The method of claim 19, wherein assembling a weld block member at an outlet end of the valve body comprises assembling a weld block member that is a seat for the spring retainer.

22. The method of claim 19, further comprising seating the discharge tube against the weld block member prior to welding the discharge tube to the valve body.

23. The method of claim 19, wherein the valve member, the biasing spring, and the spring retainer are assembled into the valve body from outside of the scroll compressor.

24. The discharge check valve assembly of claim 12, wherein the valve seat defines an inlet opening and the valve body defines an outlet opening at an outlet end of the valve body, the outlet opening being larger than the inlet opening such that assembly of the valve member, the biasing spring, and the spring retainer into the valve body from outside of the compressor is facilitated.

\* \* \* \* \*